(No Model.)
J. F. KELLY.
MEANS FOR REDUCING THE APPARENT ENERGY SUPPLIED TO ALTERNATING CURRENT MAGNETS.
No. 518,739. Patented Apr. 24, 1894.
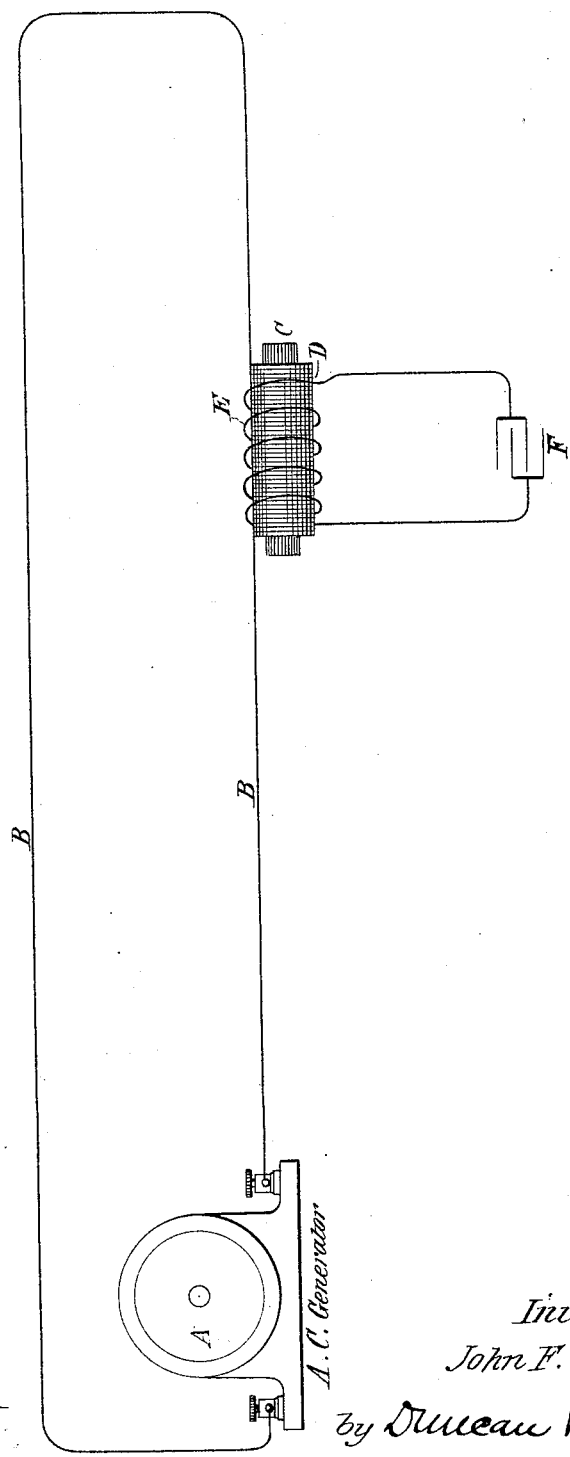
Witnesses:
Raphael Netter
James W. Catlow
Inventor
John F. Kelly
by Duncan & Page,
Attorneys.

UNITED STATES PATENT OFFICE.

JOHN F. KELLY, OF PITTSFIELD, MASSACHUSETTS, ASSIGNOR TO THE STANLEY LABORATORY COMPANY, OF SAME PLACE.

MEANS FOR REDUCING THE APPARENT ENERGY SUPPLIED TO ALTERNATING-CURRENT MAGNETS.

SPECIFICATION forming part of Letters Patent No. 518,739, dated April 24, 1894.

Application filed November 18, 1893. Serial No. 491,314. (No model.)

*To all whom it may concern:*

Be it known that I, JOHN F. KELLY, a citizen of the United States, residing at Pittsfield, in the county of Berkshire and State of Massachusetts, have invented certain new and useful Improvements in Means for Reducing the Apparent Energy Supplied to Alternating-Current Magnets, of which the following is a specification, reference being had to the drawing accompanying and forming a part of the same.

When an electro-magnet, or in general a magnetic core surrounded by an energizing coil is supplied with current from an alternating current generator at a given electromotive force, the current so supplied is in general considerably in excess of that which corresponds to the amount of energy actually supplied, as the current by reason of the self induction produced by the electro-magnet is retarded in its phases or lags behind the impressed electro-motive force. This lagging current in practice involves considerable loss and extra expense by necessitating the use of large conductors, and transformers and generators of increased capacity, while it seriously interferes with the proper regulation of the generators. Various plans have been adopted and proposed for overcoming this difficulty, one being to place in parallel to the magnet or its equivalent a condenser of such capacity that the negatively lagging current in its circuit will neutralize the positively lagging current of the magnet. This is shown and described in Letters Patent of the United States to Stanley, Jr., and Kelly, No. 483,816, dated October 4, 1892. For low electro-motive forces however, this system requires a very expensive condenser, and the endeavor to obviate this difficulty led to the present invention. The plan which I have discovered is applicable generally but is more especially useful in circuits or systems where a low electro-motive force is employed, as it not only obviates the use of an expensive condenser but effectually reduces the current from the generator to the energy limit.

In carrying out my invention, instead of placing a condenser in parallel with the electro-magnet or equivalent device, I wind on this latter a second coil entirely independent of the main line and place a condenser in circuit with it, which is adjusted as to capacity so as to give the current in the secondary circuit a negative lag, or in other words to cause it to fall more nearly into coincidence of phase with the current in the primary. The secondary current will therefore impart to the core of the magnet a magnetization similar to that imparted by the primary current, and as the electro-motive force at the terminals of the primary circuit is determined by the generator it will be seen that the current supplied by the latter will be reduced, the magnetization being sustained at almost the same value by the current in the secondary.

The invention more in detail will be described by reference to the accompanying drawing which is a diagrammatic representation of an alternate current system with my invention applied thereto.

A represents a generator of alternating currents and B B the main circuit from the same.

C is the magnetic core of any electro-magnet or electro-magnetic device and D the energizing coil of the same included in or connected with the circuit B. As above pointed out, such a device produces a lagging of the current behind the impressed electro-motive force, the devices for correcting which are the secondary coil E in inductive relation to the coil D, and a condenser F in the circuit of said secondary coil. The capacity of the condenser F must be smaller than that required to completely neutralize the self-induction of the secondary at the impressed frequency of the current, which will be understood from a statement of a well known law. Considering the elements above named, the electro-magnet in the working circuit being the primary, the coil surrounding it the secondary, let A equal the apparent coefficient of self induction of the primary circuit. T equal the true coefficient of self induction of the primary circuit. S equal the coefficient of self induction of the secondary circuit. M equal the coefficient of mutual induction. R equal the resistance of the secondary circuit. C equal the capacity of the secondary circuit. $m$ equal (2 multiplied by 3.1416 multiplied by the number of complete revolutions per unit time) the angular velocity of the current, it is well known that—

$$A = T - \left(S - \frac{1}{m^2 C}\right) \frac{M^2 m^2}{R^2 + \left(mS - \frac{1}{mC}\right)^2}$$

To make the apparent coefficient of the self induction of the primary (A) greater than the true coefficient of self induction (T), the apparent coefficient of self induction of the secondary $\left(S - \frac{1}{m^2 C}\right)$ must be negative, that is $S < \frac{1}{m^2 C}$. The secondary current will then possess a negative lag with respect to its electro-motive force. By making the resistance of the secondary (R) very low as compared with $mS - \frac{1}{mC}$, and properly proportioning the values of S and C, A may be made to have several times the value of T. It is understood throughout of course that the mutual induction is good, and that M approximates to its maximum value $\sqrt{TS}$.

From the above it will be seen that by giving to the condenser F a proper value, the coefficient of apparent self induction of the primary may be made much greater than the true self induction and consequently the current may be reduced to the energy limit.

What I claim as my invention is—

As a means of reducing the current required for energizing an electro-magnet by an alternating current, the combination with said electro-magnet and in inductive relation to its primary or energizing coil of a secondary coil and a condenser in the circuit of said coil and of a capacity less than that required for neutralizing the self induction of said secondary for a given frequency, as set forth.

JOHN F. KELLY.

Witnesses:
C. C. CHESNEY,
W. J. DAVIS.